United States Patent
Sampath et al.

(10) Patent No.: US 9,445,346 B2
(45) Date of Patent: Sep. 13, 2016

(54) TONE SELECTION IN COMMUNICATION NETWORKS

(71) Applicant: QUALCOMM Incorporated, San Diego, CA (US)

(72) Inventors: Ashwin Sampath, Princeton, NJ (US); Gavin Bernard Horn, La Jolla, CA (US); Husheng Li, Knoxville, TN (US)

(73) Assignee: QUALCOMM Incorporated, San Diego, CA (US)

( * ) Notice: Subject to any disclaimer, the term of this patent is extended or adjusted under 35 U.S.C. 154(b) by 331 days.

(21) Appl. No.: 14/183,064

(22) Filed: Feb. 18, 2014

(65) Prior Publication Data

US 2014/0161080 A1   Jun. 12, 2014

Related U.S. Application Data

(62) Division of application No. 12/183,764, filed on Jul. 31, 2008, now Pat. No. 8,665,803.

(51) Int. Cl.
*H04W 40/16* (2009.01)
*H04W 72/02* (2009.01)
(Continued)

(52) U.S. Cl.
CPC .............. *H04W 40/16* (2013.01); *H04L 5/006* (2013.01); *H04L 5/0007* (2013.01); *H04L 5/0033* (2013.01); *H04L 5/0042* (2013.01); *H04L 5/0048* (2013.01); *H04L 5/0062* (2013.01); *H04W 72/02* (2013.01); *H04L 5/0005* (2013.01);
(Continued)

(58) Field of Classification Search
CPC . H04L 1/0026; H04L 1/0011; H04L 1/0005; H04L 1/0003; H04L 5/0037; H04L 27/2601; H04L 1/0009; H04L 5/0073; H04J 11/005; H04W 72/042; H04W 72/082; H04W 24/08; H04W 72/0453; H04W 72/0406; H04W 74/04; H04B 17/345
See application file for complete search history.

(56) References Cited

U.S. PATENT DOCUMENTS

| | | | |
|---|---|---|---|
| 5,867,478 | A | 2/1999 | Baum et al. |
| 6,822,953 | B1 | 11/2004 | Schaefer et al. |
| 6,961,364 | B1 | 11/2005 | Laroia et al. |

(Continued)

FOREIGN PATENT DOCUMENTS

| | | |
|---|---|---|
| CN | 1187930 A | 7/1998 |
| EP | 1646163 A2 | 4/2006 |

(Continued)

OTHER PUBLICATIONS

International Search Report and Written Opinion—PCT/US2009/052016, International Search Authority—European Patent Office—Feb. 9, 2011.

(Continued)

*Primary Examiner* — Jung-Jen Liu
(74) *Attorney, Agent, or Firm* — James K. O'Hare

(57) ABSTRACT

Tones within a channel can be selected randomly and/or based on orthogonal tone selection. Random selection can include selecting tones randomly from a fixed set, which is referred to as channelized tone selection. Channelized tone selection can be chosen if a critical tone exists. Random selection can also include selecting resources randomly from the total number of resources available, which is referred to as non-channelized tone selection. Orthogonal tone selection can be chosen to mitigate the probability of receiver desensitization and/or to attempt to mitigate interference.

16 Claims, 10 Drawing Sheets

(51) Int. Cl.
*H04L 5/00* (2006.01)
*H04W 72/08* (2009.01)

(52) U.S. Cl.
CPC ............ *H04L 5/0053* (2013.01); *H04L 5/0066* (2013.01); *H04W 72/082* (2013.01)

(56) References Cited

U.S. PATENT DOCUMENTS

| | | |
|---|---|---|
| 7,149,238 B2 | 12/2006 | Agee et al. |
| 7,272,109 B2 | 9/2007 | Webster et al. |
| 7,339,882 B2 | 3/2008 | Schaefer et al. |
| 7,693,124 B2 | 4/2010 | Subrahmanyam et al. |
| 7,711,029 B2 | 5/2010 | Guey |
| 7,746,760 B2 | 6/2010 | Vijayan et al. |
| 7,826,861 B2 | 11/2010 | Nakamura et al. |
| 7,912,012 B2 | 3/2011 | Ma et al. |
| 7,933,244 B2 | 4/2011 | Li et al. |
| 7,948,863 B2 | 5/2011 | Wang et al. |
| 8,654,815 B1 * | 2/2014 | Forenza ............... H04B 7/0626 375/141 |
| 2002/0119781 A1 * | 8/2002 | Li ......................... H04L 1/0003 455/450 |
| 2003/0039237 A1 | 2/2003 | Forslow et al. |
| 2004/0095907 A1 * | 5/2004 | Agee .................... H04B 7/0417 370/334 |
| 2004/0146003 A1 | 7/2004 | Schaefer et al. |
| 2005/0013386 A1 * | 1/2005 | Ojard .................... H04B 1/719 375/316 |
| 2005/0117670 A1 * | 6/2005 | Webster ............. H04L 27/2602 375/330 |
| 2005/0135295 A1 * | 6/2005 | Walton .................. H04W 74/00 370/328 |
| 2005/0152326 A1 | 7/2005 | Vijayan et al. |
| 2006/0002362 A1 | 1/2006 | Subrahmanyam et al. |
| 2006/0148482 A1 * | 7/2006 | Mangold ............... H04W 16/14 455/450 |
| 2007/0064586 A1 | 3/2007 | Ma et al. |
| 2007/0071114 A1 * | 3/2007 | Sanderford, Jr. ......... H04L 5/06 375/259 |
| 2007/0105576 A1 | 5/2007 | Gupta et al. |
| 2007/0133462 A1 | 6/2007 | Guey |
| 2007/0264939 A1 * | 11/2007 | Sugar .................. H04B 17/309 455/67.11 |
| 2008/0025267 A1 | 1/2008 | Wei et al. |
| 2008/0045175 A1 | 2/2008 | Yoon et al. |
| 2008/0117867 A1 * | 5/2008 | Yin ....................... H04L 1/0029 370/329 |
| 2008/0130715 A1 | 6/2008 | Gorday et al. |
| 2008/0139237 A1 | 6/2008 | Papasakellariou |
| 2008/0167040 A1 | 7/2008 | Khandekar et al. |
| 2009/0005094 A1 * | 1/2009 | Lee ..................... H04W 52/383 455/509 |
| 2009/0046694 A1 | 2/2009 | Matsumoto et al. |
| 2009/0080561 A1 | 3/2009 | Wang et al. |
| 2009/0103509 A1 * | 4/2009 | Sanderford, Jr. ......... H04L 5/06 370/343 |
| 2009/0109907 A1 * | 4/2009 | Tsai ........................ H04J 4/00 370/329 |
| 2009/0116430 A1 * | 5/2009 | Bonta ................... H04W 84/18 370/329 |
| 2009/0270025 A1 * | 10/2009 | Kossi .................... H04W 84/18 455/3.01 |
| 2009/0279498 A1 | 11/2009 | Li et al. |
| 2009/0303918 A1 | 12/2009 | Ma et al. |
| 2010/0027479 A1 | 2/2010 | Sampath et al. |
| 2010/0046447 A1 | 2/2010 | Palanki et al. |
| 2010/0118826 A1 * | 5/2010 | Chong .................... H04B 7/12 370/330 |
| 2010/0271930 A1 | 10/2010 | Tong et al. |
| 2011/0149807 A1 * | 6/2011 | Yin ....................... H04L 1/0029 370/256 |

FOREIGN PATENT DOCUMENTS

| | | |
|---|---|---|
| WO | WO-9701256 | 1/1997 |
| WO | WO-2005029788 | 3/2005 |
| WO | WO-2007052767 A1 | 5/2007 |
| WO | WO-2008014473 | 1/2008 |
| WO | WO-2008052204 | 5/2008 |
| WO | WO-2008070292 A2 | 6/2008 |

OTHER PUBLICATIONS

Jette, et al., "UMBFDD Draft Technology Overview, IEEE C802.20-07/09", IEEE 802.20 Working Group on Mobile Broadband Wireless Access, Mar. 5, 2007, pp. 1-34.

Taiwan Search Report—TW098125724—TIPO—Feb. 9, 2013.

* cited by examiner

TONE SELECTION IN COMMUNICATION NETWORKS

RELATED APPLICATIONS

The present application is a division of U.S. patent application Ser. No. 12/183,764 filed on Jul. 31, 2008, now U.S. Pat. No. 8,665,803, titled "TONE SELECTION IN COMMUNICATION NETWORKS" which is hereby incorporated by reference in its entirety.

BACKGROUND

I. Field

The following description relates generally to wireless communications and more particularly to selection of tones in communication networks.

II. Background

Wireless communication systems are widely deployed to provide various types of communication. For example, voice, data, video and so forth can be provided through wireless communication systems. A typical wireless communication system, or network, can provide multiple users access to one or more shared resources. For instance, a system may use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Wireless communication networks are commonly utilized to communicate information regardless of where a user is located (inside or outside a structure) and whether a user is stationary or moving (e.g., in a vehicle, walking). Generally, wireless communication networks are established through a mobile device communicating with a base station or access point. The access point covers a geographic range or cell and, as the mobile device is operated, the mobile device can be moved in and out of these geographic cells.

A network can also be constructed utilizing solely peer-to-peer devices without utilizing access points or the network can include both access points (infrastructure mode) and peer-to-peer devices. These types of networks are sometimes referred to as ad hoc networks. Ad hoc networks can be self-configuring whereby when a mobile device (or access point) receives communication from another mobile device, the other mobile device is added to the network. As mobile devices leave the area, they are dynamically removed from the network. Thus, the topography of the network can be constantly changing.

At times, some transmission links (e.g., communications between devices) might experience interference, which at times might be strong interference, from other transmission links. This interference can be caused by the random deployment that exists in ad hoc networks. For example, in a peer-to-peer ad hoc network, there is no central authority (e.g., base station) that transmits broadcast signals. Thus, synchronization is performed in an informal manner by the devices within the peer-to-peer network. Therefore, a problem with peer-to-peer ad hoc networks is interference.

In typical wide-area cellular wireless systems, the interference observed persists for a period of time and comes from several interferers with no single interferer being overly dominant. Aspects of the interferers make them appear as white Gaussian noise at a receiver, which can be accounted for by using techniques such as linear filtering. Increasingly deployed are ad hoc networks (e.g., hot-spots, home base stations, Femto cells, peer-to-peer, etc.), which facilitate direct device communication without consideration of whether there is a more optimal serving link as in typical wide-area cellular wireless deployments. Because more optimal serving links can exist without being utilized in the ad hoc deployments, there is a much greater likelihood of dominant interference from the more optimal serving link (or to the more optimal serving link).

Typically, in infrastructure networks, mobile devices search and connect to the best (from a radio link quality or load perspective) base station (also referred to as access point). However, in peer-to-peer or other applications, such as home base stations (also called Femto cells), a device connects directly to the device it desires to communicate with (peer-to-peer) or is allowed to communicate with (e.g., home base station/Femto cell scenario). This constraint, sometimes called restricted association, can give rise to much stronger interference than might be observed in conventional infrastructure-based cellular networks.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more features and corresponding disclosure thereof, various aspects are described in connection with tone selection in a communication network. The tones can be selected randomly, based on a channelized scheme and/or based on a non-channelized scheme. In accordance with some aspects, the tones are selected based on orthogonal tone selection.

An aspect relates to a method for selecting tones in a communication network. The method includes determining if at least one tone contains critical information and selecting tones in a channel based on the determination. The method also includes transmitting on the selected tones in the channel.

Another aspect relates to a wireless communications apparatus that includes a memory and the processor. The memory retains instructions related to determining if at least one tone contains critical information, selecting tones in a channel based on the determination, and transmitting on the selected tones in the channel. The processor is coupled to the memory and is configured to execute the instructions retained in the memory.

Still another aspect relates to a communications apparatus that includes a means for determining if at least one tone contains critical information. The apparatus also includes a means for selecting tones in a channel based on the determination and a means for transmitting on the selected tones in the channel.

Yet another aspect relates to a computer program product for tone selection comprising a computer-readable medium that includes a first set of codes for causing a computer to determine if at least one tone contains critical information. The computer-readable medium also includes a second set of codes for causing the computer to select tones in a channel based on the determination and a third set of codes for causing the computer to transmit on the selected tones in the channel.

Still another aspect relates to at least one processor configured for selecting tones in a communication network.

The processor includes a first module for determining if at least one tone contains critical information and a second module for selecting tones in a channel based on the determination. The processor also includes a third module for transmitting on the selected tones in the channel.

Another aspect relates to a method for selecting tones in a communication network. The method includes receiving information relating to a first channel used by at least one neighboring device and selectively choosing at least one tone with a smallest interference and noise power based in part on the received information. The method also includes using the at least one tone with the smallest interference and noise power to form a second channel and selecting the second channel to communicate with at least one neighboring device within the communication network.

Still another aspect relates to a wireless communications apparatus that includes a processor and a memory. The processor is coupled to the memory and is configured to execute the instructions retained in the memory. The memory retains instructions related to receiving information relating to a first channel used by at least one neighboring device and selectively choosing at least one tone with a smallest interference and noise power. The memory also retains instructions related to using the at least one tone with the smallest interference and noise power to form a second channel and selecting the second channel to communicate with the at least one neighboring device within the communication network.

A further aspect relates to a communications apparatus comprising a means for receiving information relating to a first channel used by at least one neighboring device and a means for choosing at least one tone with a smallest interference and noise power. The communications apparatus also includes a means for using the at least one tone with the smallest interference and noise power to form a second channel and a means for selecting the second channel to communicate with the at least one neighboring device within the communication network.

Yet another aspect relates to a computer program product for selecting tones in a communication network. The computer program product includes a computer-readable medium that includes a first set of codes for causing a computer to receive information relating to a first channel used by at least one neighboring device and a second set of codes for causing the computer to choose at least one tone with a smallest interference and noise power. The computer-readable medium also includes a third set of codes for causing the computer to utilize the at least one tone with the smallest interference and noise power to form a second channel. A fourth set of codes for causing the computer to choose the second channel to communicate with the at least one neighboring device within the communication network is also included.

A further aspect relates to at least one processor configured to provide tone selection. The processor includes a first module for receiving information relating to a first channel used by at least one neighboring device and a second module for choosing at least one tone with a smallest interference and noise power. The at least one tone does not cause excessive interference to the at least one neighboring device within the communication network. The processor also includes a third module for using the at least one tone with the smallest interference and noise power to form a second channel and a fourth module for selecting the second channel to communicate with the at least one neighboring device within the communication network.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the features may be employed. Other advantages and novel features will become apparent from the following detailed description when considered in conjunction with the drawings and the disclosed examples are intended to include all such aspects and their equivalents.

DETAILED DESCRIPTION

Various aspects are now described with reference to the drawings. In the following description, for purposes of explanation, numerous specific details are set forth in order to provide a thorough understanding of one or more aspects. It may be evident, however, that such features(s) may be practiced without these specific details. In other instances, well-known structures and devices are shown in block diagram form in order to facilitate describing these features.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various examples are described herein in connection with a wireless terminal. A wireless terminal can also be called a system, subscriber unit, subscriber station, mobile station, mobile device, mobile, remote station, remote terminal, access terminal, user terminal, terminal, wireless communication device, user agent, user device, or user equipment (UE). A wireless terminal may be a cellular telephone, a smart phone, a cordless telephone, a Session Initiation Protocol (SIP) phone, a wireless local loop (WLL) station, a personal digital assistant (PDA), a handheld device having wireless connection capability, a laptop, a handheld computing device, a satellite radio, a global positioning system, a node, and/or a processing device connected to a wireless modem.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Figure 1:
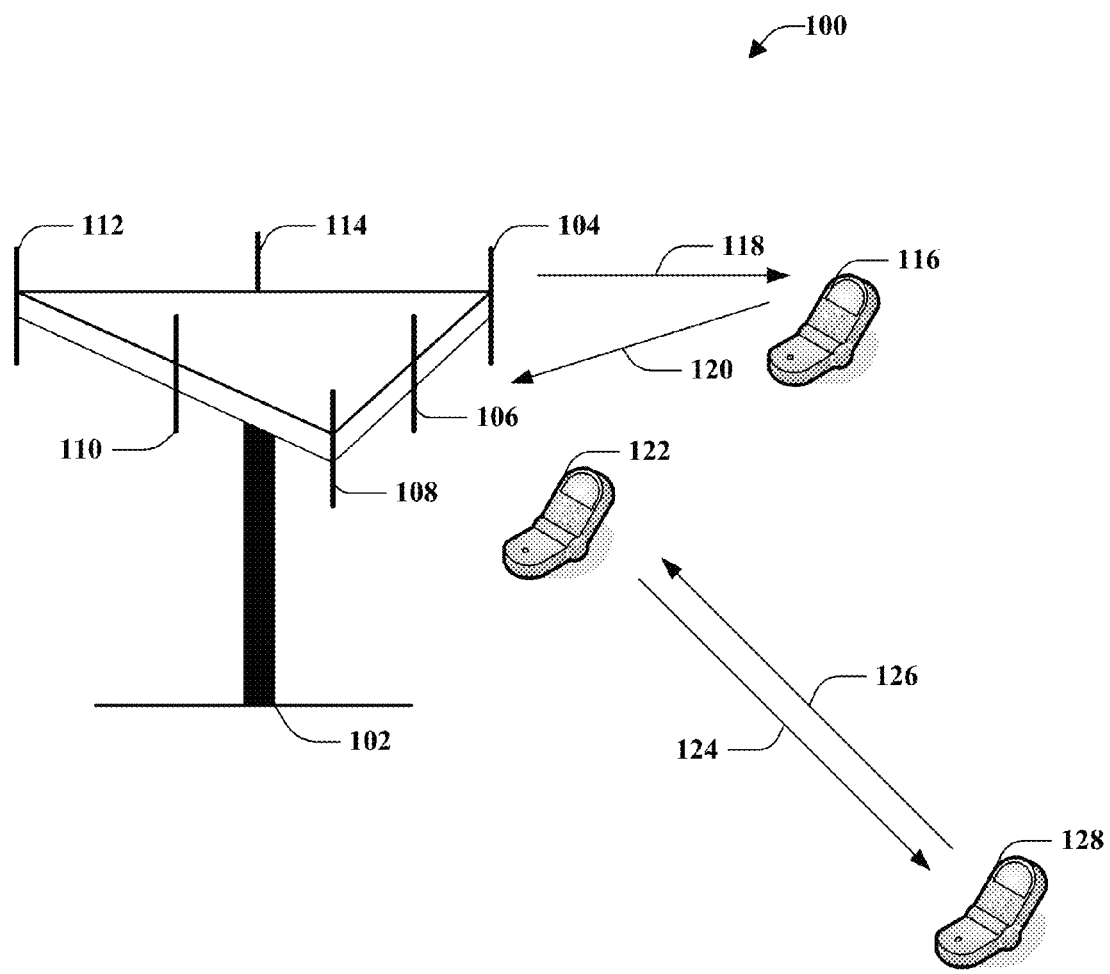
FIG. 1 illustrates a wireless communication network in accordance with various aspects presented herein.

Referring now to FIG. 1, a wireless communication system 100 is illustrated in accordance with various aspects presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a multitude of components associated with signal transmission and reception (e.g., processors, modulators, multiplexers, demodulators, demultiplexers, antennas, etc.), as will be appreciated by one skilled in the art. Additionally, the base station 102 can be a home base station, a Femto base station, and/or the like.

Base station 102 can communicate with one or more mobile devices such as mobile device 116; however, it is to be appreciated that base station 102 can communicate with substantially any number of mobile devices similar to mobile device 116. As depicted, mobile device 116 is in communication with antennas 104 and 106, where antennas 104 and 106 transmit information to mobile device 116 over a forward link 118 and receive information from mobile device 116 over a reverse link 120.

In addition, mobile devices 122 and 128 can be communicating with one another, such as in a peer-to-peer configuration. Moreover, mobile device 122 is in communication with mobile device 128 using similar links 124 and 126. In a frequency division duplex (FDD) system, forward link 118 can utilize a different frequency band than that used by reverse link 120, for example. Further, in a time division duplex (TDD) system, forward link 118 and reverse link 120 can utilize a common frequency band.

In a peer-to-peer ad hoc network, devices within range of each other, such as devices 122 and 128, communicate directly with each other without a base station 102 and/or a wired infrastructure to relay their communication. Additionally, peer devices or nodes can relay traffic. The devices within the network communicating in a peer-to-peer manner can function similar to base stations and relay traffic or communications to other devices, functioning similar to base stations, until the traffic reaches its ultimate destination. The devices can also transmit control channels, which carry information that can be utilized to manage the data transmission between peer nodes.

A communication network can include any number of mobile devices or nodes that are in wireless communication. Each node can be within range of one or more other nodes and can communicate with the other nodes or through utilization of the other nodes, such as in a multi-hop topography (e.g., communications can hop from node to node until reaching a final destination). For example, a sender node may wish to communicate with a receiver node. To enable packet transfer between sender node and receiver node, one or more intermediate nodes can be utilized. It should be understood that any node can be a sender node and/or a receiver node and can perform functions of either sending and/or receiving information at substantially the same time (e.g., can broadcast or communicate information at about the same time as receiving information).

Any node within network can transmit channel information. The nodes can be configured to selectively choose tones in a channel in peer-to-peer ad hoc type networks and each node can include a memory and a processor, coupled to the memory, configured to execute the instructions retained in the memory. It should be noted that the aspects disclosed herein may discuss tone selection in control channels based on Orthogonal Frequency Division Multiplexing (OFDM) signaling, however other techniques can be utilized with the disclosed aspects. Additionally, although the various aspects may be described with reference to a control channel, the various aspects can be applied to other types of channels. In OFDM signaling, each node utilizes one set of tones to transmit the necessary controlling information for the data transmission (e.g., request to transmit, grant to transmit). In peer-to-peer ad hoc type networks, there is no center base station (e.g., no access point) and each node can communicate with its peer node when there is a data burst. Therefore, prior to the data transmission a channel can be utilized to manage the data transmission between peer nodes and other competing links sharing the medium. The channel, which can be a control channel, may be utilized by the transmitting peer node that desires to transmit and explicitly or implicitly identify to whom it wishes to transmit. The channel may include some attributes of the desired transmission (e.g., the Quality of Service (QoS)). Similarly, on the channel, the receiving peer node may acknowledge receipt of the transmitter's request and provide some information on how to transmit.

Among a set of links competing for a shared medium in the absence of a central coordinator, such as a base station, each transmitter (receiver) should select a set of tones from a common pool in order to conduct its communication on the control channel. To facilitate tone selection in the control channel of peer-to-peer ad hoc networks, each node can employ random tone selection and/or orthogonal tone selection. Random tone selection means that from the total set of available tones for control, each node randomly chooses a certain number of tones to transmit its signal. The selection of tones can be performed in a pseudo-random fashion utilizing a common notion of system time (e.g., from a GPS or other external source) and source/destination node identity to determine which tones to select. Random selection can include channelized tone selection or non-channelized tone selection. Channelized tone selection can be chosen if one or more critical tones exist (such as a pilot tone). A critical tone is one which, if interfered with, can cause the transmission to fail, even if the other tones that constitute the control transmission are not interfered with. If a critical tone does not exist, non-channelized tone selection can be chosen as it provides the least constraint on resource selection from the common space, which can improve the communication performance of the devices (by mitigating the probability of multiple nodes selecting the same resource).

Channelized tone selection will now be described with reference to the following example. In this example, the total control space comprises 32 tones and 8 symbols. Furthermore, a control transmission, in this example, requires the selection of 4 tones. In channelized tone selection, the space of 256 tones is divided in a pre-determined manner into 64 choices and a node picks one of the 64 at random. On the other hand, for non-channelized, random selection, any choice of 4 tones out of the space of 256 tones is allowed, which allows a large set of choices.

When utilizing orthogonal selection, the selection of tones can be made based on the tones with the smallest interference and noise power. In accordance with some aspects, during orthogonal selection, the selection of tones can be made based on the symbol with the smallest total interference power and then the tones with the smallest interference power within the selected symbol are the tones chosen for the control channel. Channelized tone selection may be suitable for the orthogonal selection case. Further information relating to random tone selection and orthogonal tone selection are provided below.

Figure 2:
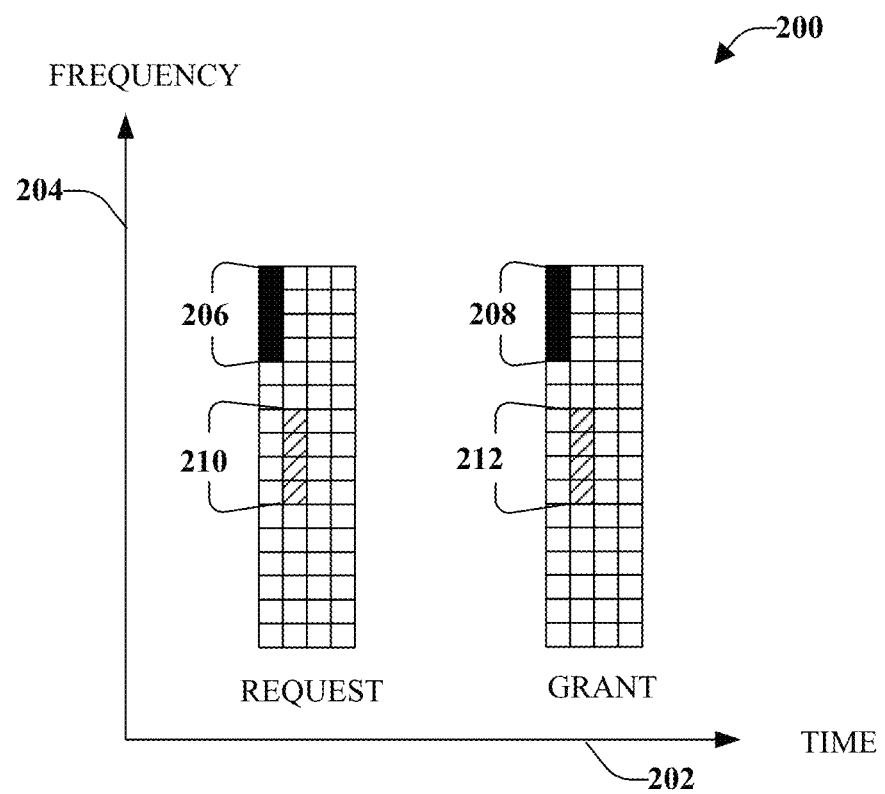
FIG. 2 illustrates an example of an OFDM control channel.

FIG. 2 illustrates an example of an OFDM control channel 200, however, other types of channels can be utilized with the disclosed aspects. A control channel 200 is a logical channel that carries signaling information typically utilized to establish and control voice or data communications. In a peer-to-peer ad hoc network, the control channel contains information relating to how peer devices can establish communication with the device sending the control channel information. Devices within the vicinity monitor the information within the control channel, and based on the information, can establish communications with the transmitting device.

As illustrated, the horizontal axis 202 represents time and the vertical axis 204 represents frequency. Each vertical column represents an OFDM symbol and each row represents a frequency tone. The illustrated control channel 200 contains eight OFDM symbols, each having 16 tones, indexed as 1, 2, . . . , 16. Each small box represents a tone-symbol, which is a single tone over a single transmission symbol period. Control channel 200 includes signals, which are transmitted sequentially over time. A signal includes one or more (e.g., a small number) symbols.

In the illustrated example, four OFDM symbols are used for "Request" for transmission (sent by the transmitter to request to be scheduled by the receiver) and four OFDM symbols are used for "Grant" of transmission (sent by the receiver as acknowledging the request and asking the transmitter to go ahead). This can assume that each link uses four tones within the same symbol to convey the information of "Request" and "Grant". Within these four tones, one tone can be used for pilot and three tones can be used for request/grant information (e.g., using Quadrature Phase Shift Keying (QPSK) modulation and convey six coded or uncoded bits). It should be noted that the disclosed aspects could be utilized in other contexts, wherein the above described assumption can be relaxed and applied in a general context. For example, the four tones need not be on the same OFDM symbol.

Figure 3:
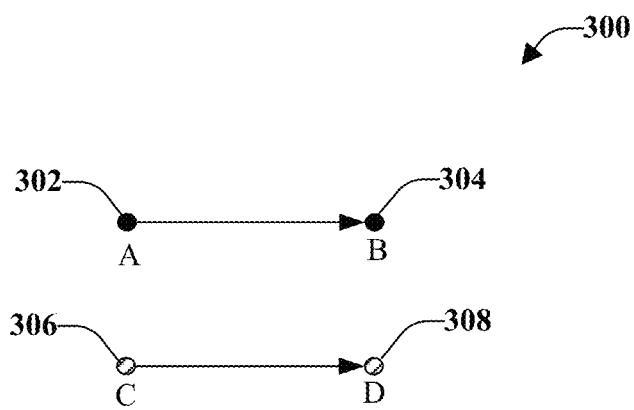
FIG. 3 illustrates a simple two-link peer-to-peer network.

FIG. 3 illustrates a simple two-link peer-to-peer network 300 in which Node "A" 302 transmits to Node "B" 304 and Node "C" 306 transmits to Node "D" 308. The communication path between the nodes is referred to as a "link". It should be noted that this figure is for illustration purposes only and other links, which can be more complex, can be utilized with the disclosed techniques. Additionally, Nodes "A", "B", "C", and/or "D" 302-308 can utilize different types of configurations, including a configuration similar to the wireless communications network 100 of FIG. 1.

Peer-to-peer networks do not rely on the presence of an access point, therefore there are no broadcast signals being sent by a central authority. Thus, each device transmits information that allows others devices that receive the transmission to establish communication with (or through) the sending device, if desired. Interference within the network might cause issues as it relates to tone selection and the successful transmission of tones within a control channel. For example, if one or more of the tones contain important information, interference might cause that important tone to not be received at the peer nodes. The important tones are those tones that are necessary for the communication and reception process, such as a pilot tone. If the important tones are not received due to interference or other communication failures, communication cannot be established with the node sending the control channel information.

With reference now to FIGS. 2 and 3, the following example is for illustration purposes and to further the understanding of the disclosed aspects. Node "A" 302 can send a "Request" for transmission to Node "B" 304 to establish communications between the nodes, which is illustrated by the four OFDM symbols at 206. Node "B" 304 can reply to Node "A" 302 with a "Grant", which is illustrated by the four OFDM symbols at 208. Similarly, Node "C" 306 can send a "Request" to Node "D" 308, illustrated by the four OFDM symbols at 210. Node "D" 308 can reply with a "Grant", illustrated by the four OFDM symbols at 212. It should be noted that although the figure illustrates the Grant and Requests in the same tone location on different symbols, the aspects are no so limited and the Grants and/or Requests can be in different tone locations on different symbols.

Since the control channel 200 is utilized in a peer-to-peer ad hoc network, there is no central authority (e.g., access point) to establish the communications between the nodes. Therefore, although illustrated and described as a selection of different tones and different symbols by the two links, there is the chance that these tones and symbols might collide if the same tones were selected by the links. If there is a collision in this example, the collision will be across all four tones (or other selected number of tones). If one or more of the tones contain important information needed to establish or aid reception of the communications (e.g., pilot tones), there might be a communication failure. Thus, the disclosed aspects provide a scheme to mitigate the probability of collision of one or more tones.

Figure 4:
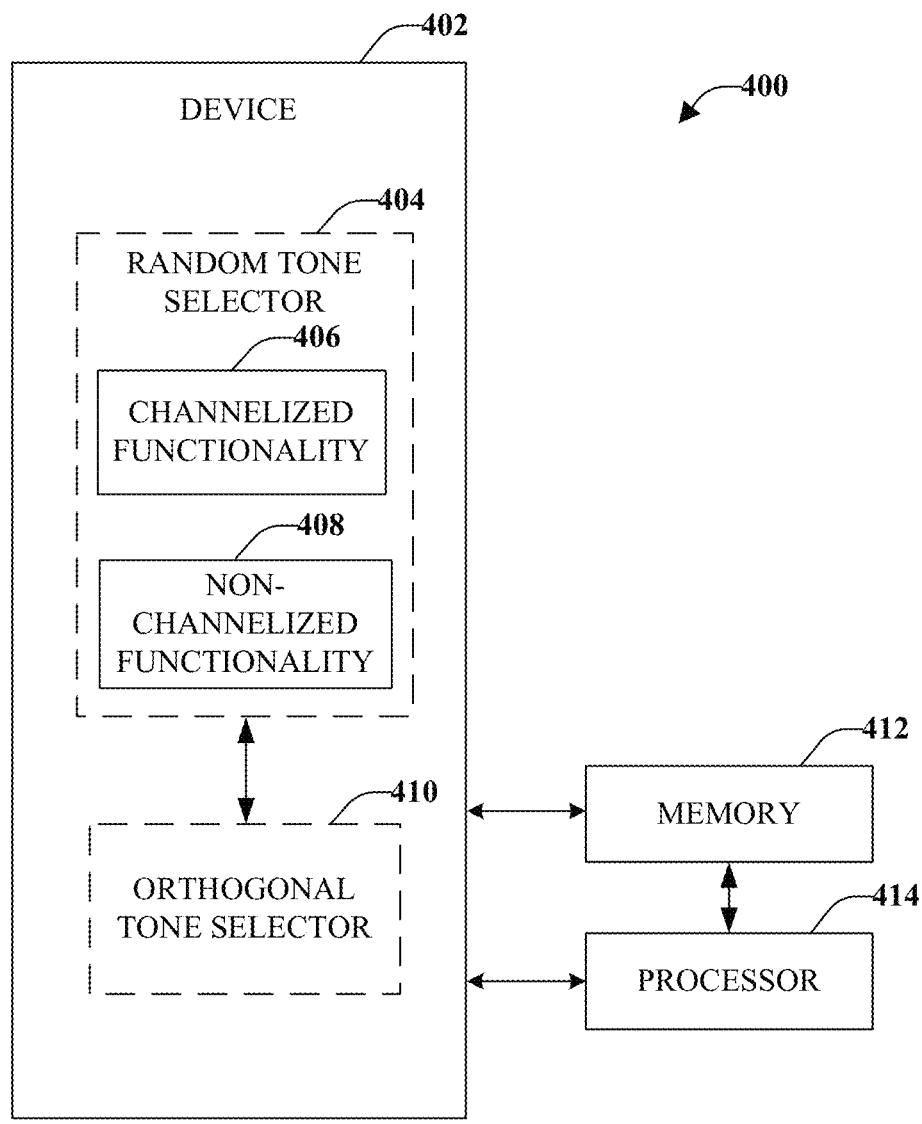
FIG. 4 illustrates a system for tone selection in a communications network.

FIG. 4 illustrates a system 400 for tone selection in a peer-to-peer communications network for a more reliable channel. System 400 can reside, for example, in a device 402. A problem associated with tone selection in peer-to-peer networks is interference avoidance since, in ad hoc networks, one transmission link may experience very strong interference from some other link due to the random deployment and restricted association in ad hoc networks. The strong interference can destroy the decoding procedure or desense (e.g., desensitize a receiver) the corresponding symbol. In the desense case, the interference can be so strong that even if the different tones on the same symbol are utilized, reception may be difficult. In this case, it might be that only separation in time will mitigate the interference.

Device 402 can include a random tone selector 404 that can be configured to determine whether to choose tones in a channel randomly. When a node or device 402 does not have information regarding possible interference, the tone selection can be performed randomly. There are at least two options with random tone selection: channelized tone selection (channelized functionality 406) and non-channelized tone selection (non-channelized functionality 408). Random tone selector 404, can be configured to choose channelized tone selection and/or non-channelized tone selection, depending on the existence of a critical tone, such as a pilot tone. Non-channelized or channelized tone selection is a long time-scale design decision and selecting tones randomly is a short time-scale design decision.

Figure 5:
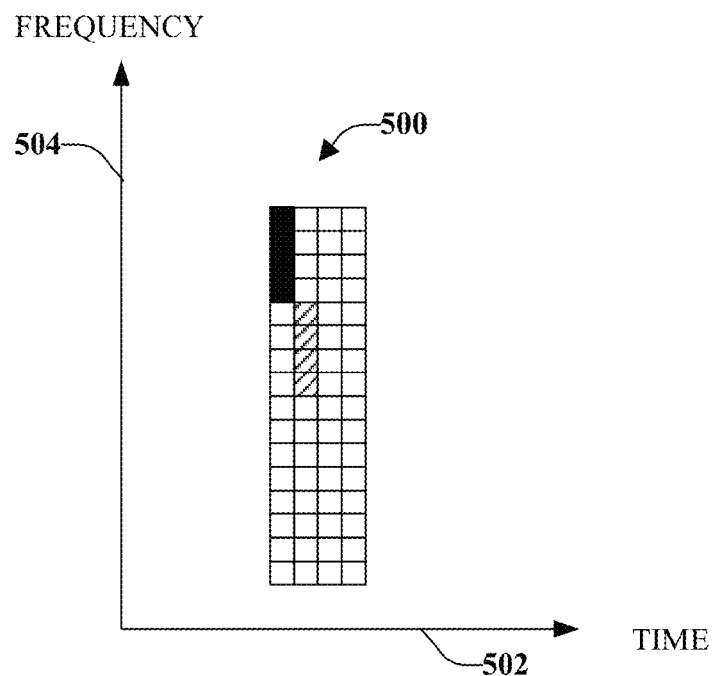
FIG. 5 illustrates an example of channelized tone selection.

In channelized tone selection, the definition of tone sets, each of which can comprise four tones, is common for all links. Therefore, a link experiences similar interference on all four tones. The channels are selected randomly. FIG. 5 illustrates an example of channelized tone selection 500. The horizontal axis 502 represents time and the vertical axis 504 represents frequency. In the channelized case 500, in each symbol, tone sets {1, 2, 3, 4} and {5, 6, 7, 8} are defined as different channels, which can be occupied by link A-B and link C-D, respectively.

Thus, random tone selector 404, utilizing channelized functionality 406, can select four tones that are contiguous and can be chosen randomly from a fixed set. In one embodiment, the sequence and combination of the tones defines the signature of device 402. The receiving device or node (not shown) receives information from the location of the tones and looks for energy on the tones associated with the signature of the sending device (e.g., device 402). These tones can be selected randomly. However, if there is a collision, the collision occurs on all four tones and the receiving device will not receive the communication, or will receive the communication with interference.

Figure 6:
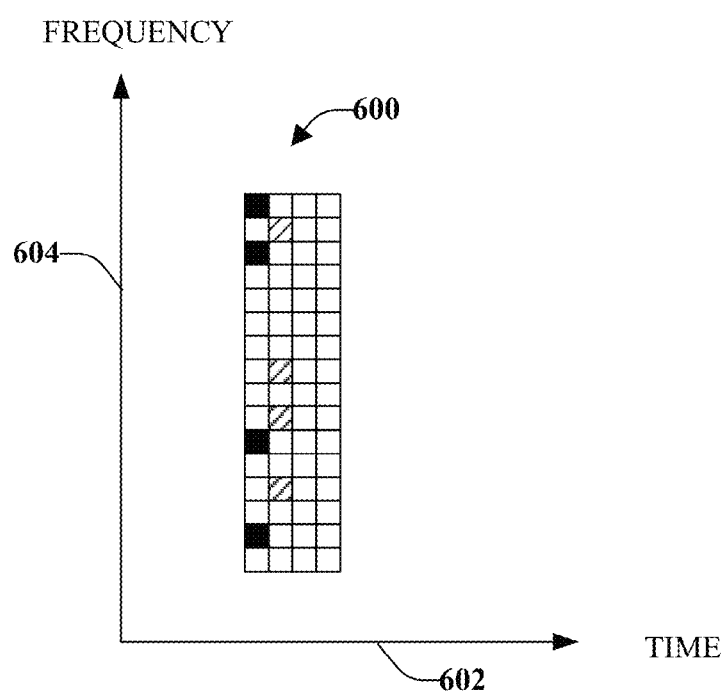
FIG. 6 illustrates an example of non-channelized tone selection.

Thus, in some cases, non-channelized tone selection might be chosen by random tone selector 404. In non-channelized tone selection, the tones are selected in a completely random way. Therefore, a link may experience different interference on the four tones or, stated differently, collisions could be limited to a subset of the tones used by a transmitting node and/or a receiving node. FIG. 6 illustrates an example of non-channelized tone selection 600. The horizontal axis 602 represents time and the vertical axis 604 represents frequency. During non-channelized tone selection, random tone selector 404, through non-channelized functionality 408, selects four tones (at random) out of the total number of tones available (e.g., 256 tones). It should be noted that although the tones illustrated are on the same OFDM channel, the disclosed aspects are not so limited.

Through utilization of non-channelized tone selection, the probability of a collision on each of the four tones can be mitigated. Since, the probability of colliding on every tone chosen by non-channelization functionality 406 is smaller than the probability of collision on every tone chosen by channelization functionality 408, random tone selector 402 might utilize the non-channelized functionality 408 if a pilot tone (or a critical tone) is not included as one or more of the four tones. For example, non-channelized random tone selection may be utilized in the case of non-coherent communication or if a pilot is provided in some other fashion outside of the four tones. The pilot tone can be provided for coherent demodulation.

In some situations (e.g., if no important tone exists), the non-channelized tone selection 600 might be preferable since it can provide more tone-symbols. In the illustrated example, for each link, there are $$\binom{64}{4}$$

possible choices for non-channelized selection. However, in channelized selection there are only sixteen possible choices. For non-channelized selection 600, if the information bits are coded, the codeword may still be recovered if a portion of the four tones collide with stronger interferences since the likelihood of all tones experiencing collision is low. This is not possible for channelized selection since each link experiences the same interference on all four tones.

When the channel is specifically known (or, as in the case of non-coherent communications, does not need to be specifically known), then, non-channelized tone selection can outperform channelized tone selection. However, when a pilot is used on one of the tones for channel estimation, channelized tone selection performs better than non-channelized tone selection. The reason for this will now be described.

There are four tones used for each link, m tones, n strong interferers (n<<m) for the link being studied. For this example, it is assumed that the decoding completely fails if the pilot collides with any strong interferer, which in practice for the restricted association mode of ad-hoc communications, is a good assumption. Then, it can be illustrated that the probability of pilot collision is given by the equation:

$$\left(\frac{m/4 - 1}{m/4}\right)^n \approx 1 - \frac{4n}{n} \qquad \text{Equation 1}$$

for the channelized tone selection case and:

$$\left(\frac{m-1}{m}\right)^{4n} \approx 1 - \frac{4n}{m} \qquad \text{Equation 2}$$

for the non-channelized tone selection case.

Thus, as shown in Equations 1 and 2, the pilot collision probability is almost the same for channelized tone selection and non-channelized tone selection cases. It should be noted that a decoding error event may arise from collision on pilot or on data. However, in the channelized tone selection case, the event of collision on a pilot is identical to that on data since the interference on all four tones are the same for any link. This makes the probability of decoding error very close to pilot collision probability. For the non-channelized tone selection case, these two events are not identical, thus making the probability of decoding error larger than pilot collision probability. Thus, the channelized tone selection scheme can achieve a lower decoding error rate than the non-channelized tone selection scheme.

In summary, if a pilot is used on one or more tones (or generally, one tone or more tones are critical, in the sense that once this tone collides with strong interference, the decoding fails with high probability), channelized tone selection is preferred. If a pilot is not used on one or more tones, non-channelized tone selection can perform better.

Alternatively or additionally, device 402 can include an orthogonal tone selector 410 that can be configured to choose one or more tones based on an orthogonal selection.

Note that in the context of random selection, for channelized or non-channelized, control channel tones selected by different transmitters/receivers could end up being orthogonal, but it is not orthogonal by design or measurement as in the case of orthogonal tone selection described herein. If the link or device 402 can sense the interference power on each tone, then the device 402 can select tones orthogonal to the tones used by other, peer devices. In accordance with an aspect, orthogonal tone selector 410 can choose the tones having the smallest interference power in an attempt to mitigate interference.

In accordance with other aspects, orthogonal tone selector 410 can select the symbol having the smallest total interference and noise power, which can help mitigate the probability of desense. Next, orthogonal tone selector 410 can select the tones with the smallest interference and noise power within the chosen symbol, thus improving the chances of interference avoidance.

Orthogonal tone selector 410 can facilitate a link (or device 402) changing its tone selection to a better location if a strong interference is detected in the current location of the selected tones. The interference can be a function of a new device recently added to the ad hoc network, a change of other links (e.g., devices moving out of the network, devices changing their tone selection, and so forth), or due to other factors.

With further reference to FIG. 4, system 400 can include a memory 412 operatively coupled to device 402. Memory 412 can store information related to tone selection, channelized tone selection, non-channelized tone selection, link information, orthogonal selection, and other suitable information related to selection of tones in a peer-to-peer communication network. A processor 414 can be operatively connected to device 402 (and/or memory 412) to facilitate analysis of information related to mitigating tone selection in a communication network. Processor 414 can be a processor dedicated to analyzing and/or generating information received by device 402, a processor that controls one or more components of system 400, and/or a processor that both analyzes and generates information received by device 402 and controls one or more components of system 400.

Memory 412 can store protocols associated with selecting tones within a channel, mitigating interference associated with the tones, selectively modifying an orthogonal tone selection based on experienced interference, mitigating interference, detecting a pilot tone, detecting interference, taking action to control communication such that system 400 can employ stored protocols and/or algorithms to achieve improved communications in a wireless network as described herein.

In accordance with some aspects, memory 412 retains instructions related to determining if at least one tone contains critical information, selecting tones in a channel based on the determination, and transmitting on the selected tones in the channel. Memory 412 can also retain instructions related to choosing a channelized tone selection if the determination is that at least one tone contains critical information. Additionally or alternatively, memory 412 retains instructions related to selecting the tones randomly from a fixed set of tones, wherein each tone comprises a channel.

According to some aspects, memory 412 retains instructions related to receiving information related to a first channel used by at least one neighboring device and selectively choosing at least one tone with a smallest interference and noise power. Memory 412 also retains instructions related to using the at least one tone with the smallest interference and noise power to form a second channel and selecting the second channel to communicate with the at least one neighboring device within the communication network. According to some aspects, memory 412 further retains instructions relating to selecting the at least one tone that does not cause excessive interference to the at least one neighboring device within the communication network. Memory 412 may also retain instructions related to identifying a symbol with the smallest total interference power, identifying one or more tones with the smallest interference power, the one or more tones are included in the identified symbol, and using the identified one or more tones in the second channel. According to some aspects, memory 412 retains instructions related to observing interference in the network, determining if there is strong interference experienced on the at least one tone used in the channel, and selectively changing the at least one tone used in the channel if strong interference is experienced.

It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (DRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 412 of the disclosed embodiments are intended to comprise, without being limited to, these and other suitable types of memory.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 7:
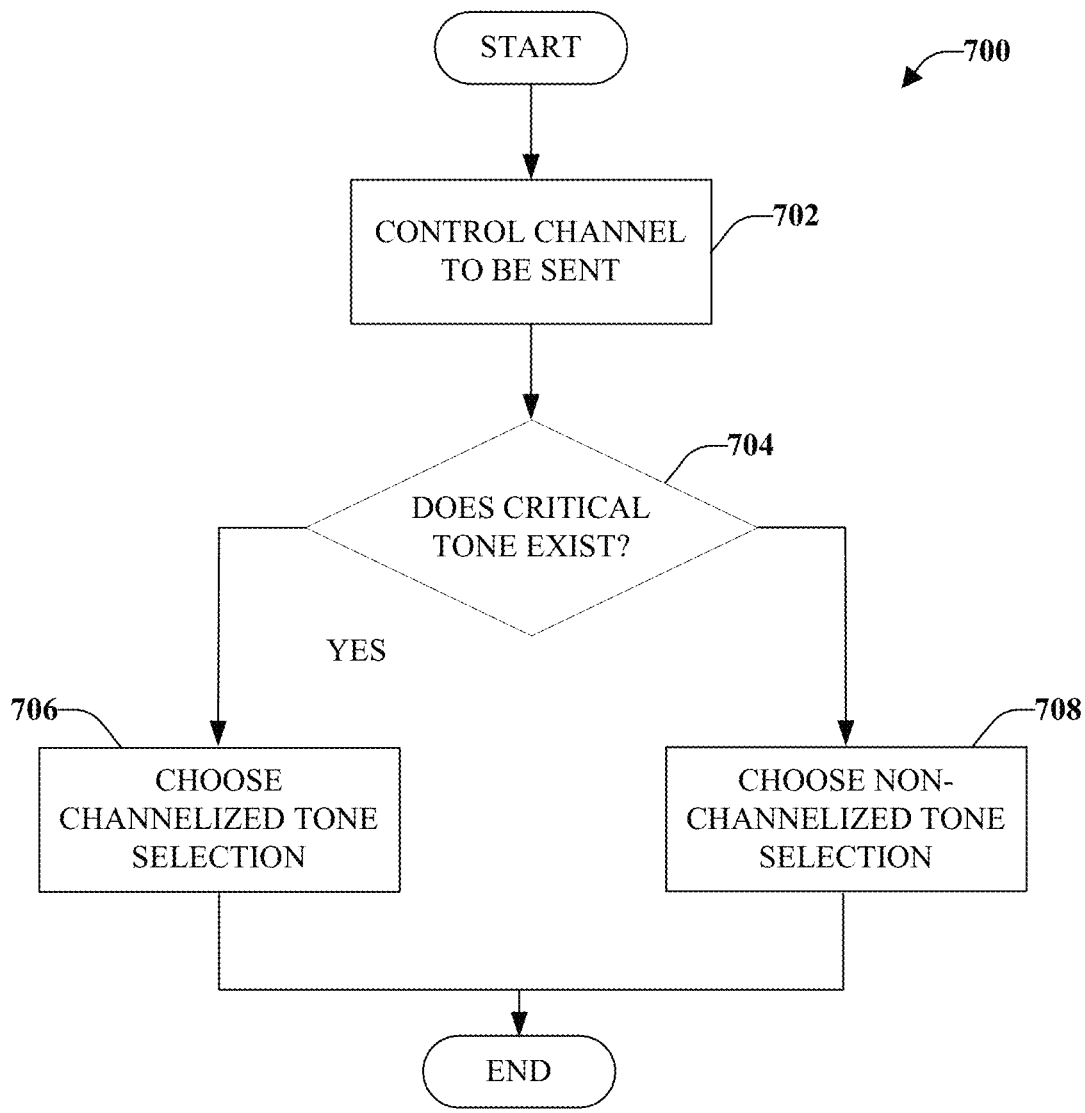
FIG. 7 illustrates a method for random tone selection.

FIG. 7 illustrates a method 700 for random tone selection in a control channel. Random selection includes channelized tone selection and/or non-channelized tone selection. Channelized tone selection can be utilized is a critical tone exists. If a critical tone does not exist, then non-channelized tone selection can be utilized. Method 700 starts, at 702, when a channel is to be sent within a peer-to-peer ad hoc network. For example, a control channel can be sent that carries information that can be utilized by other, peer devices within the peer-to-peer ad hoc network to communicate with the sending device.

In order to select the tones in the control channel, a determination is made, at 704, whether a critical tone, such as pilot tone, is being sent. In accordance with some aspects, the at least one critical tone is a pilot tone for coherent demodulation. If there is a critical tone ("YES"), method 700 continues, at 706, and channelized tone selection is chosen. Channelized tone selection comprises selecting one channel from a set of pre-defined channels, wherein each channel comprises at least one tone. The tones can be selected randomly from a fixed set of tones, wherein each tone comprises a channel. In accordance with some aspects, in channelized tone selection, contiguous tones are selected.

If the determination, at 704, is that a critical tone does not exist, then at 708, non-channelized tone selection can be chosen. The non-channelized tone selection can be a long time-scale design decision. In non-channelized tone selection, the tones can be chosen randomly from a total number of tones available. Selecting the tones randomly can be a short time-scale design decision. The tones chosen by non-channelized tone selection can be contiguous, non-contiguous, or combinations thereof. It should be noted that, in accordance with some aspects, channelized tone selection can be chosen even if critical tones do not exist.

Figure 8:
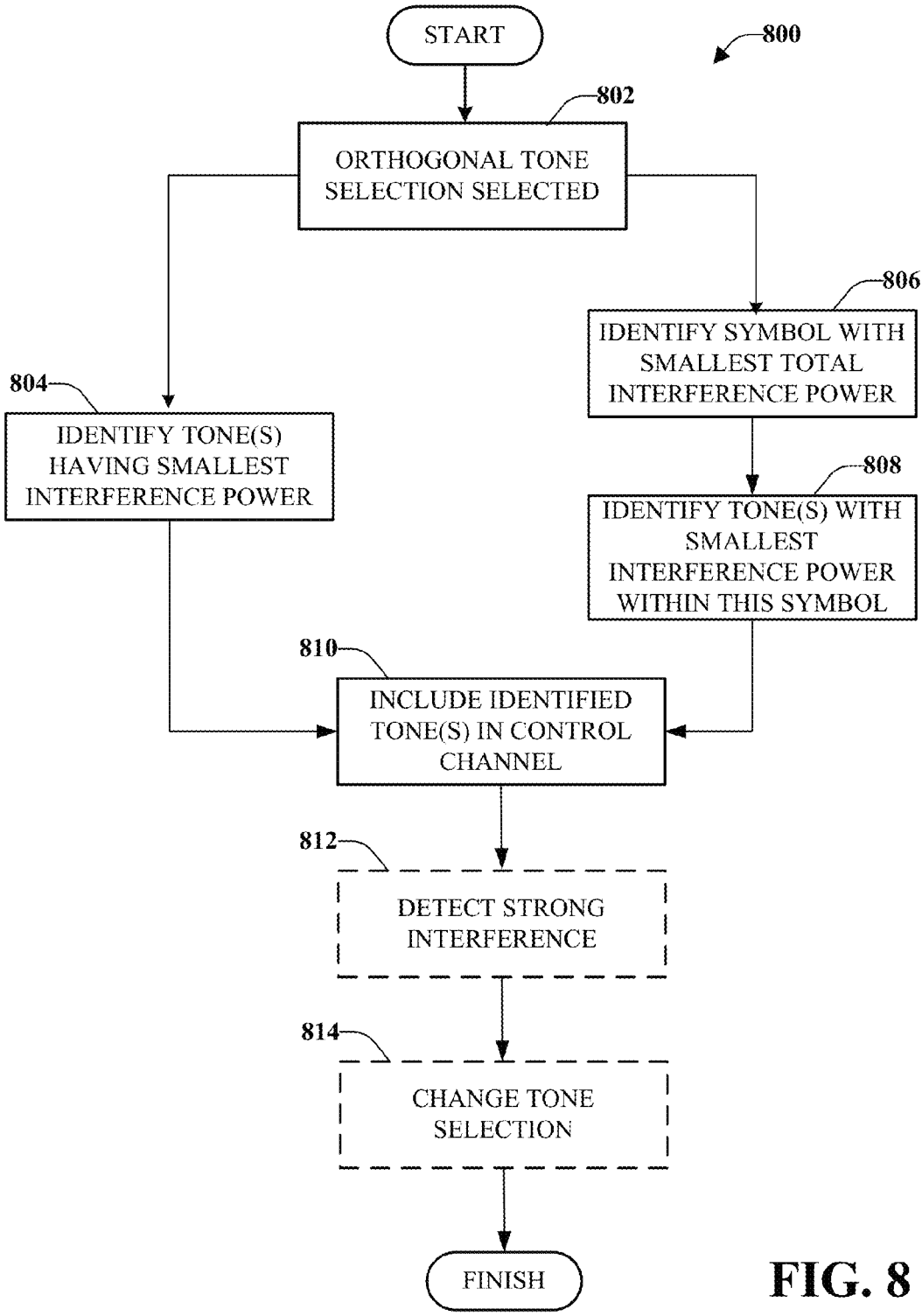
FIG. 8 illustrates a method for orthogonal tone selection.

FIG. 8 illustrates a method 800 for orthogonal tone selection in a control channel. Method 800 starts, at 802, when orthogonal tone selection is chosen. There are at least two methods of choosing tones in an orthogonal tone selection scheme. In the first method, the tones with the smallest interference and noise power are identified, at 804, which can mitigate the probability of desense. In a second method, the symbol with the smallest total interference power is identified, at 806. At 808, the tones with the smallest power within the chosen symbol are identified, which can help achieve interference avoidance. At 810, regardless of the method utilized to choose the tones, the tones identified, at 804 and/or 808, are selected to constitute the control channel.

In accordance with some aspects, a strong interference might be detected, at 812. This interference can be caused by a new device entering the peer-to-peer network, a change in other links, or based on other factors. If interference is detected, at 814 the tone selection is changed to a better location (e.g., a location with less interference). The tone selection can be changed in an orthogonal manner or in a random manner. The tone selection can be changed any number of times based on the observed performance.

Figure 9:
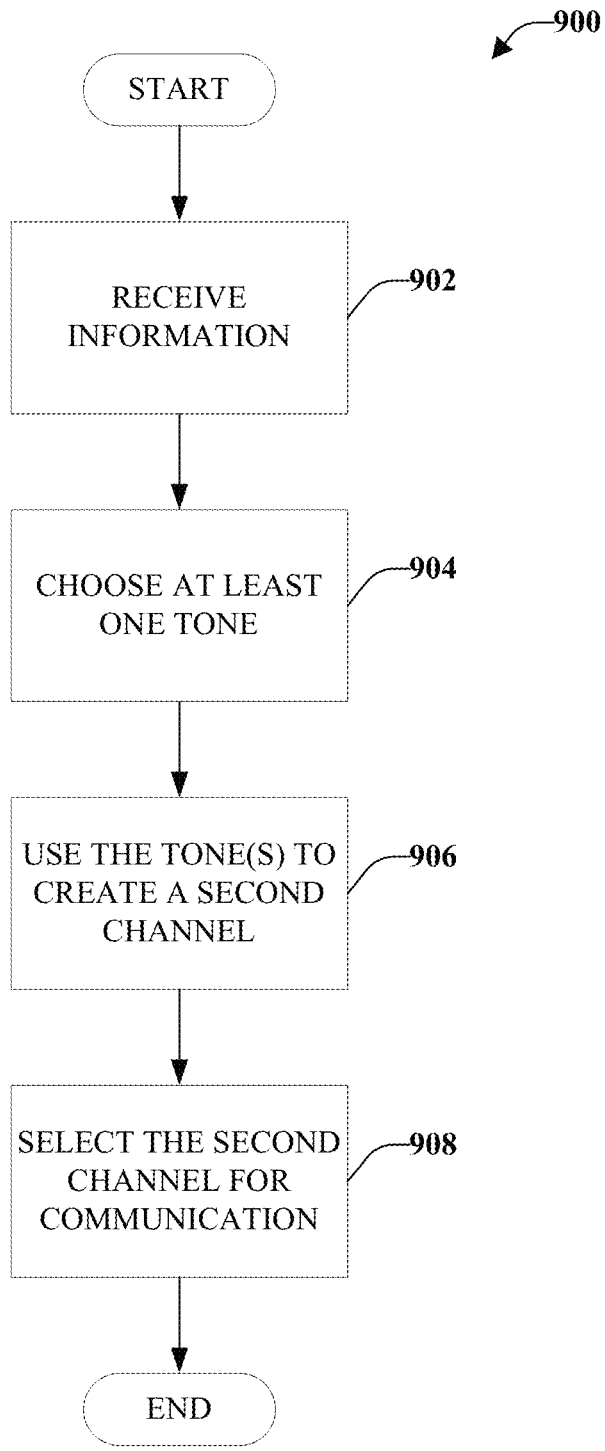
FIG. 9 illustrates a system that facilitates tone selection in a wireless communication environment in accordance with one or more of the disclosed embodiments.

FIG. 9 illustrates a method 900 for selecting tones in a communication network. At 902, information related to a first channel used by at least one neighboring device is received. At least one tone with a smallest interference and noise power is selectively chosen, at 904. The choice is made based on the received information. At 906, the tone(s) with the smallest interference and noise power are utilized to form a second channel. At 908, the second channel is selected to communicate with the neighboring device(s).

In accordance with some aspects, the tone can be chosen by selecting that at least one tone that does not cause excessive interference to the neighboring device(s). According to some aspects, choosing the tone includes identifying a symbol with the smallest total interference power and identifying one or more tones, included in the identified symbols, with the smallest interference power. The identified one or more tones are utilized to form the second channel. The tone(s) can be from the same symbol.

Figure 10:
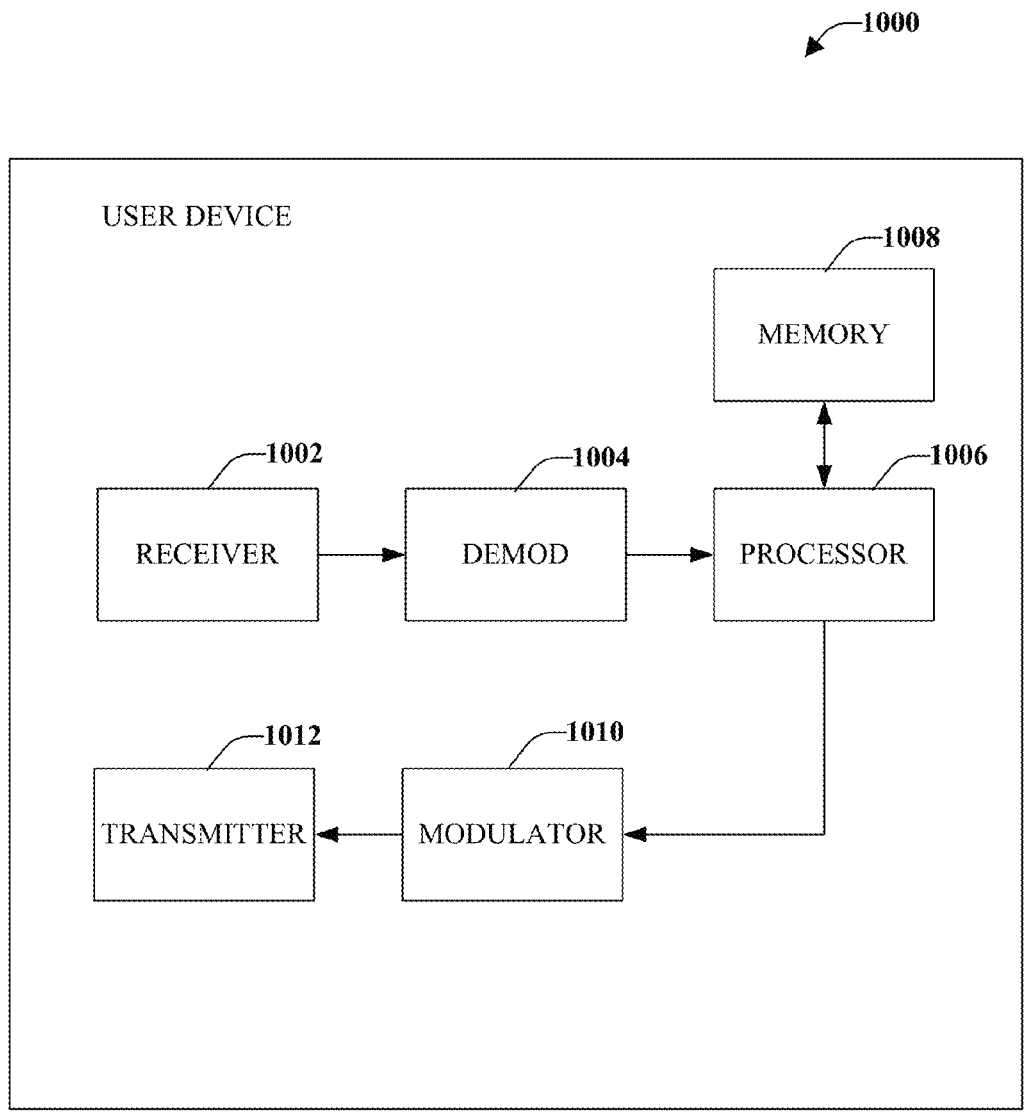
FIG. 10 illustrates a system that facilitates tone selection within a peer-to-peer ad hoc wireless communication environment in accordance with one or more of the disclosed embodiments.

With reference now to FIG. 10, illustrated is a system 1000 that facilitates tone selection in a control channel within a peer-to-peer ad hoc wireless communication environment in accordance with one or more of the disclosed embodiments. System 1000 can reside in a user device. System 1000 comprises a receiver 1002 that can receive a signal from, for example, a receiver antenna. The receiver 1002 can perform typical actions thereon, such as filtering, amplifying, etc. the received signal. The receiver 1002 can also digitize the signal to obtain samples. A demodulator 1004 can retrieve information bits from the received signals and provide them to a processor 1006.

Processor 1006 can be a processor dedicated to analyzing information received by receiver component 1002 and/or generating information for transmission by a transmitter 1012, such as a control channel. Additionally or alternatively, processor 1006 can control one or more components of user device 1000, analyze information received by receiver 1002, generate information for transmission by transmitter 1016, and/or control one or more components of user device 1000. Processor 1006 may include a controller component capable of coordinating communications with additional user devices.

User device 1000 can additionally comprise memory 1008 operatively coupled to processor 1006 and that can store information related to coordinating communications and any other suitable information. Memory 1008 can additionally store protocols associated with coordinating communication and/or selecting tones in a control channel. User device 1000 can further comprise a symbol modulator 1010 and a transmitter 1012 that transmits the modulated signal.

Figure 11:
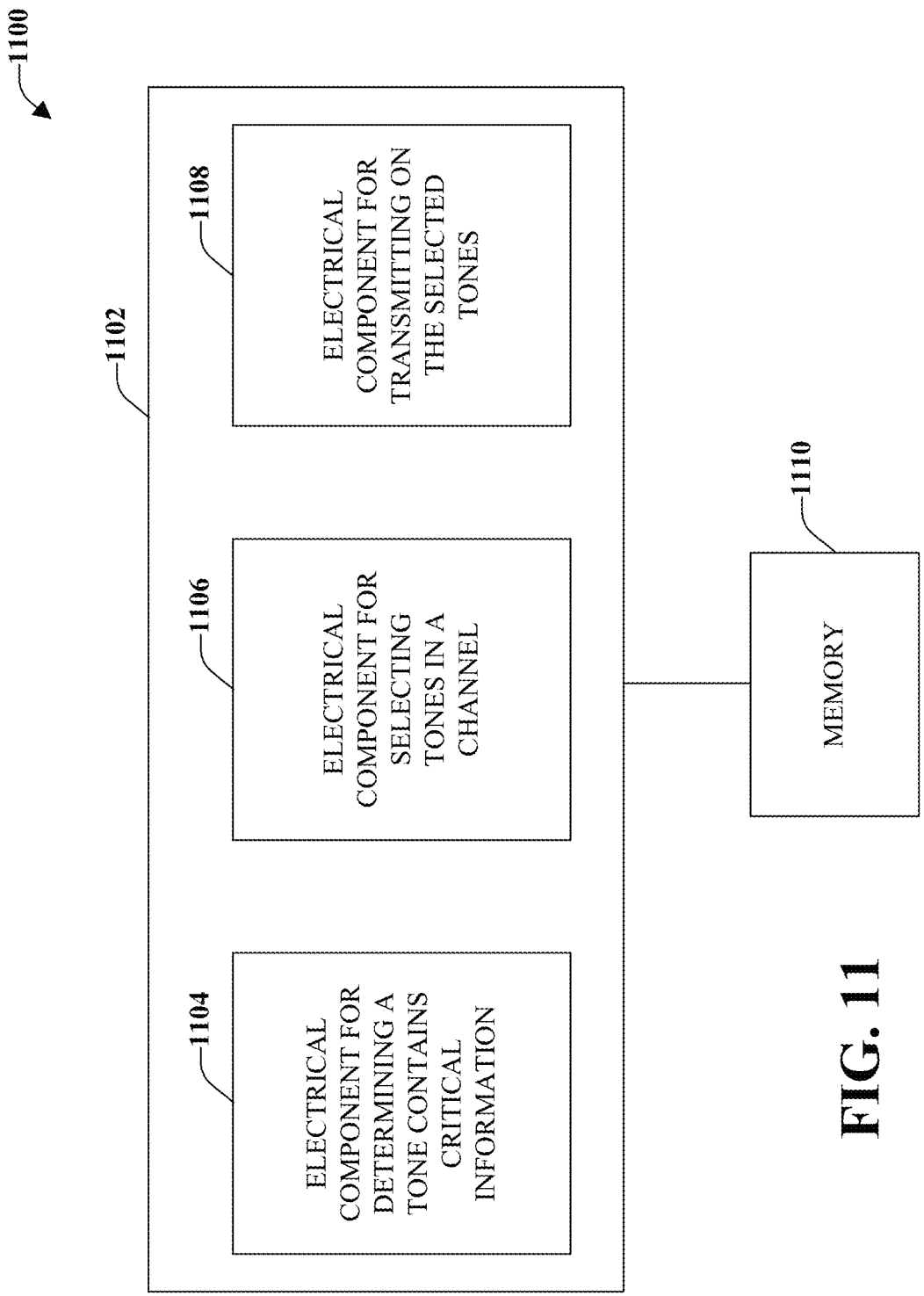
FIG. 11 illustrates an example system that facilitates random tone selection in a communication network.

With reference to FIG. 11, illustrated is an example system 1100 that facilitates random tone selection in a communication network. System 1100 is represented as including functional blocks, which may be functional blocks that represent functions implemented by a processor, software, or combination thereof (e.g., firmware).

System 1100 includes a logical grouping 1102 of electrical components that can act separately or in conjunction. Logical grouping 1102 includes an electrical component 1104 for determining if at least one tone contains critical information. The critical information can be a pilot tone. Also included in logical grouping 1102 is an electrical component 1106 for selecting tones in a channel based on the determination of whether at least one tone contains critical information. In accordance with some aspects, the selection of the tones in the channel is performed randomly. According to some aspects, a non-channelized tone selection is chosen if the determination by electrical component 1104 is that at least one tone does not contain critical information. The tones can be selected randomly from a total number of tones available. Logical grouping 1102 also includes an electrical component 1108 for transmitting on the selected tones in the channel.

In accordance with some aspects, logical grouping 1102 also includes an electrical component for choosing a channelized tone selection if the determination is that at least one tone contains critical information. The channelized tone selection can include selecting the channel from a set of pre-defined channels. Each channel can include at least one tone. The tone can be selected from the pre-defined set randomly from a fixed set of tones, wherein each tone comprises a channel. The selection can be based on at least one of a system time, a node identity, or combinations thereof.

A random channelized scheme is utilized or a random non-channelized scheme is utilized. In a random channelized scheme, if one tone experiences interference, generally all the tones that constitute a channel will experience interference. In a random non-channelized scheme, there is diversity and the transmission is encoded over all the tones. In the random non-channelized scheme, the likelihood of all tones experiencing interference is low and, if a tone does experience interference, the remaining tones can be utilized to decode the message. If there is a critical tone, such as a tone that includes a pilot symbol, then the random channelized scheme should be chosen.

Additionally, system 1100 can include a memory 1110 that retains instructions for executing functions associated with electrical components 1104, 1106, and 1108 or other components. While shown as being external to memory 1110, it is to be understood that one or more of electrical components 1104, 1106, and 1008 may exist within memory 1110.

Figure 12:
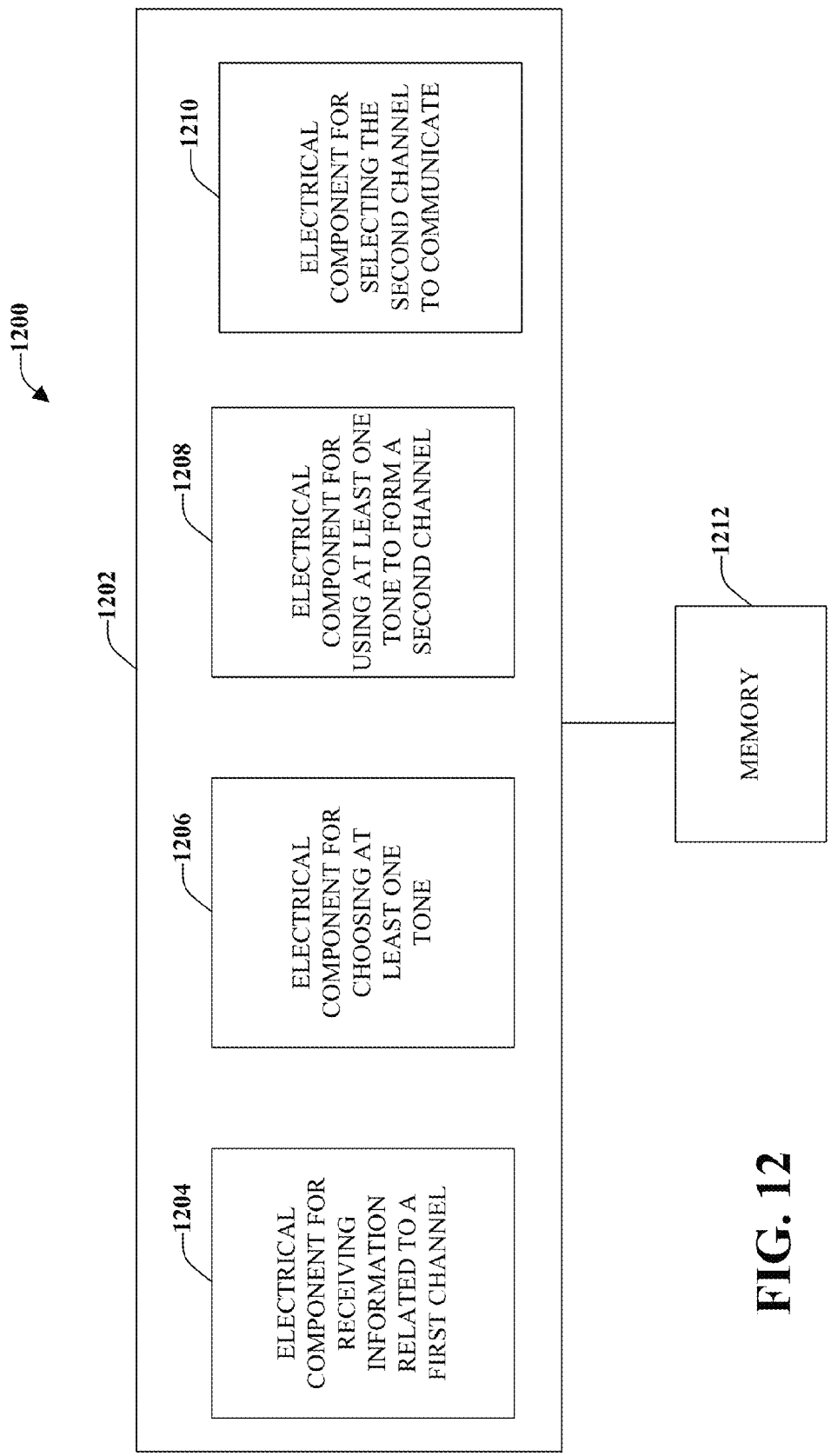
FIG. 12 illustrates an example system that facilitates orthogonal tone selection in a communication network.

FIG. 12 illustrates an example system 1200 that facilitates orthogonal tone selection in a communication network. System 1200 is represented as including functional blocks, which may be functional blocks that represent functions implemented by a processor, software, or combination thereof (e.g., firmware). System 1200 includes a logical grouping 1202 of electrical components that can act separately or in conjunction. Logical grouping 1202 includes an electrical component 1204 for receiving information related to a first channel used by at least one neighboring device.

Logical grouping 1202 also includes an electrical component 1206 for choosing at least one tone with a smallest interference and noise power. Electrical component 1206 can also select the at least one tone that does not cause excessive interference to the at least one neighboring device within the communication network. Additionally or alternatively, electrical component 1206 can identify a symbol with the smallest total interference power, identify one or more tones with the smallest interference power, and utilize the identified one or more tones in the second channel. The one or more tones are included in the identified symbol.

Also included in logical grouping 1202 is an electrical component 1208 for using the at least one tone with the smallest interference and noise power to form a second channel. Further, logical grouping 1202 includes an electrical component 1210 for selecting the second channel to communicate with the at least one neighboring device within the communication network.

Additionally, system 1200 can include a memory 1212 that retains instructions for executing functions associated with electrical components 1204, 1206, 1208, and 1210 or other components. While shown as being external to memory 1212, it is to be understood that one or more of electrical components 1204, 1206, 1208, and 1210 may exist within memory 1212.

It is to be understood that the aspects described herein may be implemented by hardware, software, firmware or any combination thereof. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description of the claims is meant to be a "non-exclusive or".

What is claimed is:

1. A method for selecting tones in a communication network, comprising:
   receiving information related to a first channel used by at least one neighboring device;
   selecting a first method or a second method for tone selection, wherein:
     if the first method is selected, then selectively choosing at least one tone with a smallest interference and noise power based in part on the received information, and
     if the second method is selected, then selectively choosing, from within a symbol having the smallest total interference power, at least one tone with a smallest power based in part on the received information;
   using the chosen at least one tone with the smallest interference and noise power to form a second channel; and
   selecting the second channel to communicate with at least one neighboring device within the communication network.

2. The method of claim 1, wherein selectively choosing the at least one tone with the smallest interference and noise power comprising:
   selecting the at least one tone that does not cause excessive interference to the at least one neighboring device within the communication network.

3. The method of claim 1, wherein the one or more identified tones are from the same symbol.

4. The method of claim 1, further comprising:
   observing interference in the network;
   determining there is strong interference experienced on the at least one tone used in the channel; and
   selectively changing the at least one tone used in the channel.

5. A wireless communications apparatus, comprising:
   a memory that retains instructions related to:
     receiving information related to a first channel used by at least one neighboring device,
     selecting a first method or a second method for tone selection, wherein:
       if the first method is selected, then selectively choosing at least one tone with a smallest interference and noise power, and
       if the second method is selected, then selectively choosing, from within a symbol having the smallest total interference power, at least one tone with a smallest power based in part on the received information,
     using the chosen at least one tone with the smallest interference and noise power to form a second channel, and
     selecting the second channel to communicate with the at least one neighboring device within the communication network; and
   a processor, coupled to the memory, configured to execute the instructions retained in the memory.

6. The wireless communications apparatus of claim 5, the memory further retains instructions related to selecting the at least one tone that does not cause excessive interference to the at least one neighboring device within the communication network.

7. The wireless communications apparatus of claim 5, the memory further retains instructions related to observing interference in the network, determining if there is strong interference experienced on the at least one tone used in the channel, and selectively changing the at least one tone used in the channel if strong interference is experienced.

8. A communications apparatus, comprising:
   means for receiving information related to a first channel used by at least one neighboring device;
   means for selecting a first method or a second method for tone selection, wherein:
   means for choosing, if the first method is selected, at least one tone with a smallest interference and noise power based in part on the received information; and
   means for choosing, if the second method is selected, from within a symbol having the smallest total interference power, at least one tone with a smallest power based in part on the received information;
   means for using the chosen at least one tone with the smallest interference and noise power to form a second channel; and
   means for selecting the second channel to communicate with the at least one neighboring device within the communication network.

9. The communications apparatus of claim 8, wherein the means for choosing at least one tone further selects the at least one tone that does not cause excessive interference to the at least one neighboring device within the communication network.

10. The communications apparatus of claim 8, wherein the one or more identified tones are from the same symbol.

11. The communications apparatus of claim 8, further comprising:
    means for observing interference in the network;
    means for determining there is strong interference experienced on the at least one tone used in the channel; and
    means for selectively changing the at least one tone used in the channel.

12. A computer program product, comprising:
    a computer-readable medium comprising:
    a first set of codes for causing a computer to receive information related to a first channel used by at least one neighboring device;
    a second set of codes for causing the computer to select a first method or a second method for tone selection, such that:
    if the first method is selected, then choosing at least one tone with a smallest interference and noise power based in part on the received information, and
    if the second method is selected, then choosing, from within a symbol having the smallest total interference power, at least one tone with a smallest power based in part on the received information;
    a third set of codes for causing the computer to utilize the chosen at least one tone with the smallest interference and noise power to form a second channel; and
    a fourth set of codes for causing the computer to choose the second channel to communicate with the at least one neighboring device within the communication network.

13. The computer program product of claim 12, the computer-readable medium further comprising:
    a fifth set of codes for causing the computer to select the at least one tone that does not cause excessive interference to the at least one neighboring device within the communication network.

14. The computer program product of claim 12, the computer-readable medium further comprising:
    a fifth set of codes for causing the computer to observe interference in the network;
    a sixth set of codes for causing the computer to determine if there is strong interference experienced on the at least one tone used in the channel; and
    a seventh set of codes for causing the computer to change the at least one tone used in the channel if strong interference is experienced.

15. At least one processor configured to provide tone selection, comprising:
    a first module for receiving information related to a first channel used by at least one neighboring device;
    a second module for selecting a first method or a second method for tone selection, and:
    if the first method is selected, then choosing at least one tone with a smallest interference and noise power based in part on the received information, and
    if the second method is selected, then choosing, from within a symbol having the smallest total interference power, at least one tone with a smallest power based in part on the received information;
    wherein the chosen at least one tone does not cause excessive interference to the at least one neighboring device within the communication network;
    a third module for using the chosen at least one tone with the smallest interference and noise power to form a second channel; and
    a fourth module for selecting the second channel to communicate with the at least one neighboring device within the communication network.

16. The at least one processor of claim 15, wherein the one or more identified tones are from different symbols.

* * * * *